United States Patent
Kelly, Jr.

(10) Patent No.: US 8,282,455 B2
(45) Date of Patent: Oct. 9, 2012

(54) SYSTEM AND METHOD FOR MEASURING THE PERFORMANCE OF A PLAYER IN A GAME

(76) Inventor: Walter Gerard Kelly, Jr., Valencia, CA (US)

(*) Notice: Subject to any disclaimer, the term of this patent is extended or adjusted under 35 U.S.C. 154(b) by 608 days.

(21) Appl. No.: 12/438,948

(22) PCT Filed: Aug. 25, 2007

(86) PCT No.: PCT/US2007/076836
§ 371 (c)(1),
(2), (4) Date: Feb. 26, 2009

(87) PCT Pub. No.: WO2008/027811
PCT Pub. Date: Mar. 6, 2008

(65) Prior Publication Data
US 2010/0004039 A1    Jan. 7, 2010

Related U.S. Application Data

(60) Provisional application No. 60/823,646, filed on Aug. 26, 2006.

(51) Int. Cl.
*A63F 9/24* (2006.01)
*G06F 19/00* (2006.01)
(52) U.S. Cl. .................. 463/3; 463/42; 463/43; 700/93
(58) Field of Classification Search .................. None
See application file for complete search history.

(56) References Cited

U.S. PATENT DOCUMENTS

| 5,949,679 A * | 9/1999 | Born et al. ........................ 700/91 |
| 6,074,312 A * | 6/2000 | Lyon et al. ..................... 473/409 |
| 2001/0051835 A1* | 12/2001 | Cline ............................... 700/91 |
| 2002/0049508 A1* | 4/2002 | Williams ......................... 700/92 |
| 2004/0023734 A1* | 2/2004 | McClain ........................ 473/409 |
| 2004/0122538 A1* | 6/2004 | Gowan ............................ 700/92 |
| 2007/0178983 A1* | 8/2007 | Sanders ......................... 473/131 |

OTHER PUBLICATIONS

Modified stableford scoring of the PGA Tour "The International". Retrieved Aug. 4, 2011. http://www.pgatour.com/story/8698568/.*
PGA Tour "The International" information. Retrieved Aug. 5, 2011. http://www.golfintl.com/.*

* cited by examiner

*Primary Examiner* — Evan Pert
*Assistant Examiner* — Andres Munoz
(74) *Attorney, Agent, or Firm* — Michael D. Eisenberg

(57) ABSTRACT

A system for measuring the performance of participant in a game, wherein the game is comprised of a series of discrete trials where for each trial the participant receives a score selected from one of a finite set of discrete scores based on the participant's performance for each trial. The system may be configured to receive over the network a set of counts corresponding to the numbers of each score from the discrete set received by the participant for each trial during the game. The system may compute a weighted score based on an assigned set of weight factors for each type of score and an entered set of counts. Users of the system may be entered into a tournament based on the users' weighted score rankings and a winner is determined based on the weighted score. A method for ranking golf courses by their level difficulty is provided.

19 Claims, 6 Drawing Sheets

CONTROL PANEL 212     PROFILE PAGE 213

SYSTEM AND METHOD FOR MEASURING THE PERFORMANCE OF A PLAYER IN A GAME

CROSS-REFERENCE TO RELATED APPLICATIONS

This application claims priority from International Application Serial Number PCT/US2007/076836 filed Aug. 25, 2007 which claims priority from U.S. Provisional Application Ser. No. 60/823,646 filed Aug. 25, 2006, and which are hereby incorporated herein by reference in their entirety.

BACKGROUND OF THE INVENTION

The subject invention generally relates to a system and methods for measuring the performance of players. Some embodiment relate to measuring the performance of golfers. Some embodiments include a system and method implemented on servers and over a network. Other embodiments relate to a social networking system and a tournament that utilizes a network and a prize for the winner of the tournament.

One current method to measure performance of a golfer is the golf handicap. One golf handicap method relies on slope and course rating of the courses played by the golfer to compute a numerical score. The golf handicap measures only the potential to perform, not total performance. For example, in one method of the handicap, the worst scores of the golfer are disregarded. It would be desirable to have a system that measures total performance and that does not depend on slope and course rating. For example, the batting average in baseball is a number that is independent of the pitchers the batter has faced and the stadiums in which he has hit. Similarly, it would be desirable to have a system to measure performance for other games or sports such as bowling.

BRIEF SUMMARY OF EMBODIMENTS OF THE INVENTION

According to one embodiment of the invention, a method of measuring the performance of a game, contest or sporting event participant is provided. The method includes providing an interface to prompt a user for inputting the number of eagles, birdies, pars, bogeys, double bogeys, and triple bogeys respectively into a system over a network via a web browser.

In one embodiment, a system for measuring the performance of participant in a game is provided. The game may be comprised of a series of discrete trials wherein for each trial the participant receives a score selected from one of a finite set of discrete scores based on the participant's performance for each trial. The system may be implemented on a computer readable medium in communicative contact with a network and has a database. In one example, the network is the Internet and the computer readable medium is a servers.

Continuing with the above example embodiment, the system may be configured to receive over the network a set of counts corresponding to the numbers of each score from the discrete set received by the participant for each trial during the game. In one example, the participants enter in their scores via the system's website. The system may compute a weighted score. The weighted score may be based on (1) an assigned set of weight factors for each type of score in the discrete set and (2) an entered set of counts of each score from the discrete set. The computed weighted score corresponds to the performance of a participant in a game.

In another embodiment, the system for measuring the performance of a participant in a game includes the game of golf and the trials may comprise each hole played by the participant. The discrete set may contain scores comprising an eagle, a birdie, a par, a bogie, a double bogie and a triple bogie.

In yet another embodiment, the system for measuring the performance of a participant in a game may include the game of golf where the weight factors are selected so that: the weight factor assigned to an eagle is greater than the weight factor assigned to a birdie; the weight factor assigned to a birdie is greater than the weight factor assigned to a par; the weight factor assigned to a par is greater than the weight factor assigned to a bogie; the weight factor assigned to a bogie is greater than the weight factor assigned to a double bogie; and the weight factor assigned to a double bogie is greater than the weight factor assigned to a triple bogie. In another embodiment, the system may specify that an eagle score corresponds to two strokes or fewer for a hole and a triple bogie corresponds to three strokes or more received by the participant for a hole played and user may input their scores to the system accordingly.

In still another embodiment, the system for measuring the performance of a participant in a game includes measuring the performance of a plurality of participants by: computing weighted scores for each participant; storing the computed weighted scores associated with each participant in a ranking database; and ranking the plurality of participants based on the computed weighted score associated with each participant.

In yet a further embodiment of the system for measuring the performance of a participant in a game, the system is configured to select a set of participants from the ranking database and store data representing the participants in a tournament qualifier database. The participants in the tournament qualifier database may be selected to compete in a game tournament for a prize. In one example, the game tournament is a golf tournament.

In another embodiment of the system for measuring the performance of a participant in a game, the system may be configured to request a verification of the entered set of counts of each score from the discrete set from a second participant. The system may be configured to communicate the entered set to the second participant and the system may be configured to query the second participant to either confirm the accuracy of the entered set or deny the accuracy of the entered set. An entered set that has been confirmed by a second participant is a verified set, and in one embodiment the system only stores data in the tournament qualifier database if it is based on verified sets.

In a further embodiment of the system for measuring the performance of a participant in a game, the ranking of the plurality of participants based on the computed weighted score of each participant may comprise ranking only members of a particular group. The particular group may be ranked based on any one of the following: all participants of the same age in years; all participants of the same skill level; all participants of the same gender; all participants who played on the same golf courses; all participants of the same postal zip code of residence; all participants who share the same employer; all participants of the same state of residence; or all participants of the same of the same country of residences.

In still another embodiment of the system for measuring the performance of a participant in a game, the system may be configured to output the computed score to a user on the network. The system may be configured to request a verification of the entered set of counts of each score from the discrete set from a second participant. The system may communicate the entered set to the second participant and the second participant and queries the second participant to either confirm the accuracy of the entered set or deny the accuracy of the entered set.

In yet a further embodiment of the system for measuring the performance of a participant in a game, the system may be configured to determine a first average computed weighted score for each participant for all games played by participants who have obtained at least one computed weighted score from playing the game at a first location where the game is played. The system may be configured to determine a second average computed weighted score for each participant for all games played only at the first location by the participant. The system may be configured to compare the first and second average computed weighted scores. If two or more participants have the same average computed weighted scores, the system may be configured to assign different rankings to each of the two or more participants based on the comparison of the first and second average computed weighted scores. For example, in one embodiment, the computed weighted score is the Splashie score as defined below. If two golfers have the same Splashie score, then the system will assign a higher rank to the golfer who has obtained more scores than the other golfer, on golf courses where the average golfer obtains lower Splashie scores than the average golfer's overall average on other courses.

In another embodiment a method for measuring the performance of a plurality golfers in a game of golf is provided. The game is comprised of 18 holes and for each hole the golfer receives a score based on the number of strokes executed to complete the hole. The method may comprise receiving a set of scores for the 18 holes of golf played by a golfer and computing a weighted score based on an assigned set of weight factors for each type of score received by the golfer on the holes played. The computed weighted score corresponds to the performance of a participant in the game.

In a further embodiment of the method for measuring the performance of a plurality golfers in a game of golf, all scores that correspond to completing a hole in two strokes below par or are treated identical to one another for computing the weighted score. All scores that correspond to completing a hole in three strokes above par or more are treated identically for computing the weighted score.

In still another embodiment of the method for measuring the performance of a plurality golfers in a game of golf, an eagle score corresponds to two strokes or fewer for a hole and a triple bogie corresponds to three strokes or more received by the participant for a hole played.

In yet a further embodiment of the method for measuring the performance of a plurality golfers, the weight factors are selected so that weight factor assigned to an eagle is greater than the weight factor assigned to a birdie. The weight factor assigned to a birdie is greater than the weight factor assigned to a par. The weight factor assigned to a par is greater than the weight factor assigned to a bogie. The weight factor assigned to a bogie is greater than the weight factor assigned to a double bogie. The weight factor assigned to a double bogie is greater than the weight factor assigned to a triple bogie.

In another embodiment of the method for measuring the performance of a plurality golfers in a game of golf, the method may include computing weighted scores for each golfer and ranking the plurality of golfers based on the computed weighted score associated with each golfer.

In a further embodiment of the method for measuring the performance of a plurality golfers in a game of golf, the method may include selecting a set of golfers having the highest rankings based on the computed weighted scores and entering the selected golfers into a golf tournament. The golfers in the tournament compete in a golf tournament for a prize.

In still another embodiment of the method for measuring the performance of a plurality golfers in a game of golf, the method may include verifying the received set of scores for the 18 holes of golf played by the golfer. The verification may comprise receiving a confirmation or a denial of the scores from a second golfer that played with the golfer on all 18 holes corresponding to the received scores. The method may include selecting only golfers having a received set of scores that have been verified to compete in the golf tournament.

In yet a further embodiment of the method for measuring the performance of a plurality golfers in a game of golf, ranking the plurality of golfers based on the computed weighted score of each golfer may comprise ranking only members of a particular group. The particular group may be ranked based on any one of the following: all golfers of the same age in years; all golfers of the same skill level; all golfers of the same gender; all golfers who played on the same golf courses; all golfers of the same postal zip code of residence; all golfers who share the same employer; all golfers of the same of the same state of residence; or all golfers of the same of the same country of residences.

In another embodiment, a system for ranking the degree of difficulty of a golf course is provided. The system may be implemented on a computer readable medium, such as a server, in communicative contact with a network, such as the Internet, and have a database. The system may be configured to receive scores resulting from rounds of golf played at golf courses and receive the identity of the golf course on which the game that produced the scores was played. The system may be configured to determine a first average of scores received by the system for all rounds of golf played by golfers that have obtained at least one score from a round of golf at the golf course. The system may determine a second average score for the golfers for all games played only at the golf course and compare the first and second average scores. The system may be configured to assign a ranking to the golf course based on the comparison.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for measuring the performance of a player in a game or sport. Before describing the invention in detail, it is useful to describe an example environment with which the invention can be implemented. One such example is that of a network based golf tournament, for example, utilizing the Internet.

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
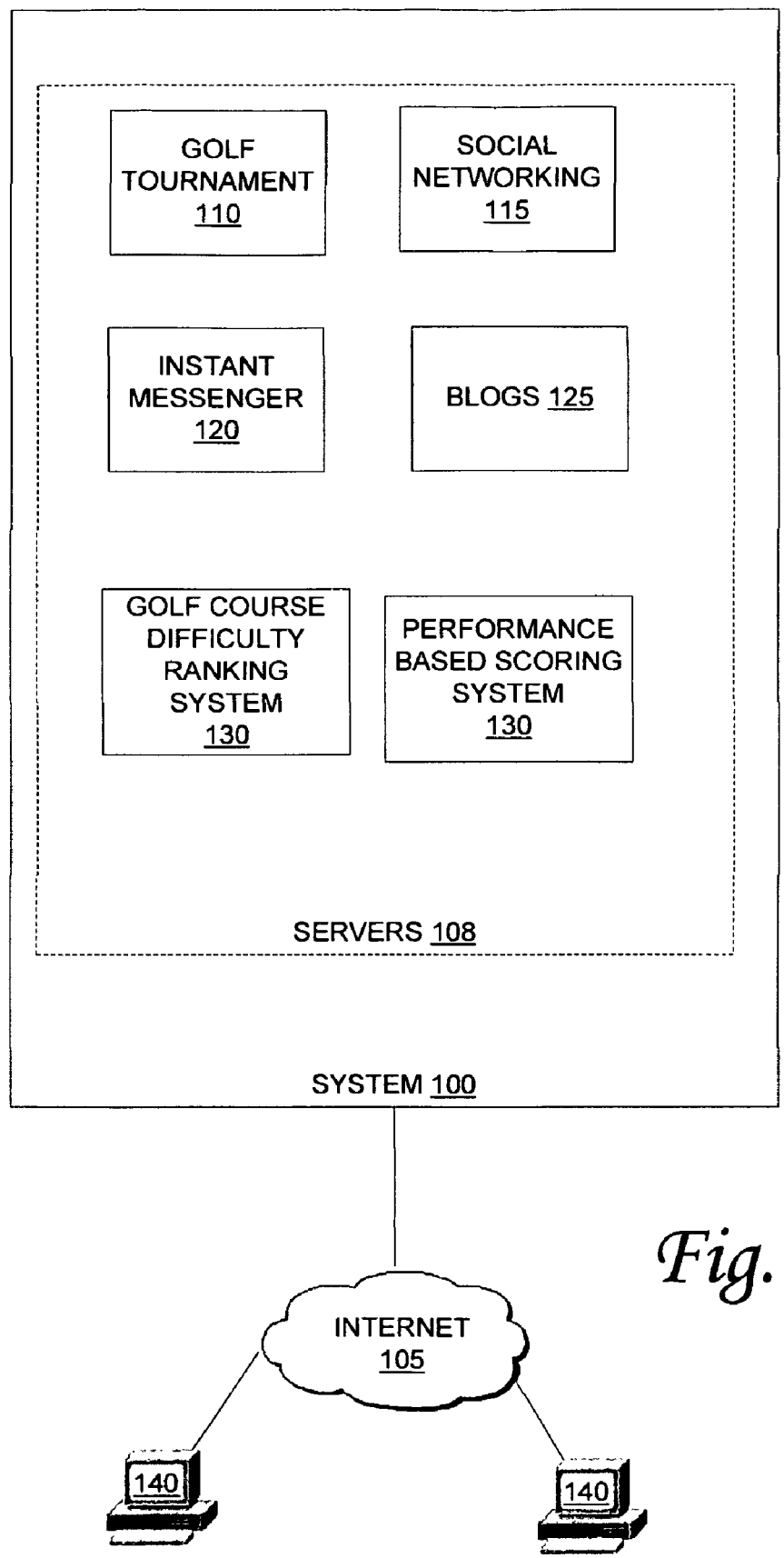
FIG. 1 is an illustration of a preferred embodiment of the system for measuring the performance of a player in accordance with the principles of the invention.

FIG. 1 illustrates a block diagram of a preferred embodiment of a system 100 for measuring the performance of a golfer. The system 100 is network based and may be implemented on servers 108 in communication via the Internet 105 through conventional web browsers. The system 100 may include a golf tournament 110, a social networking system 115, an instant messenger 120, blogs 125, a golf course difficulty ranking system 130, and a performance based scoring system 135. Users may access the system 100 through web browsers on user devices 140 such as PCs, mobile phones, PDAs and the like.

Figure 2:
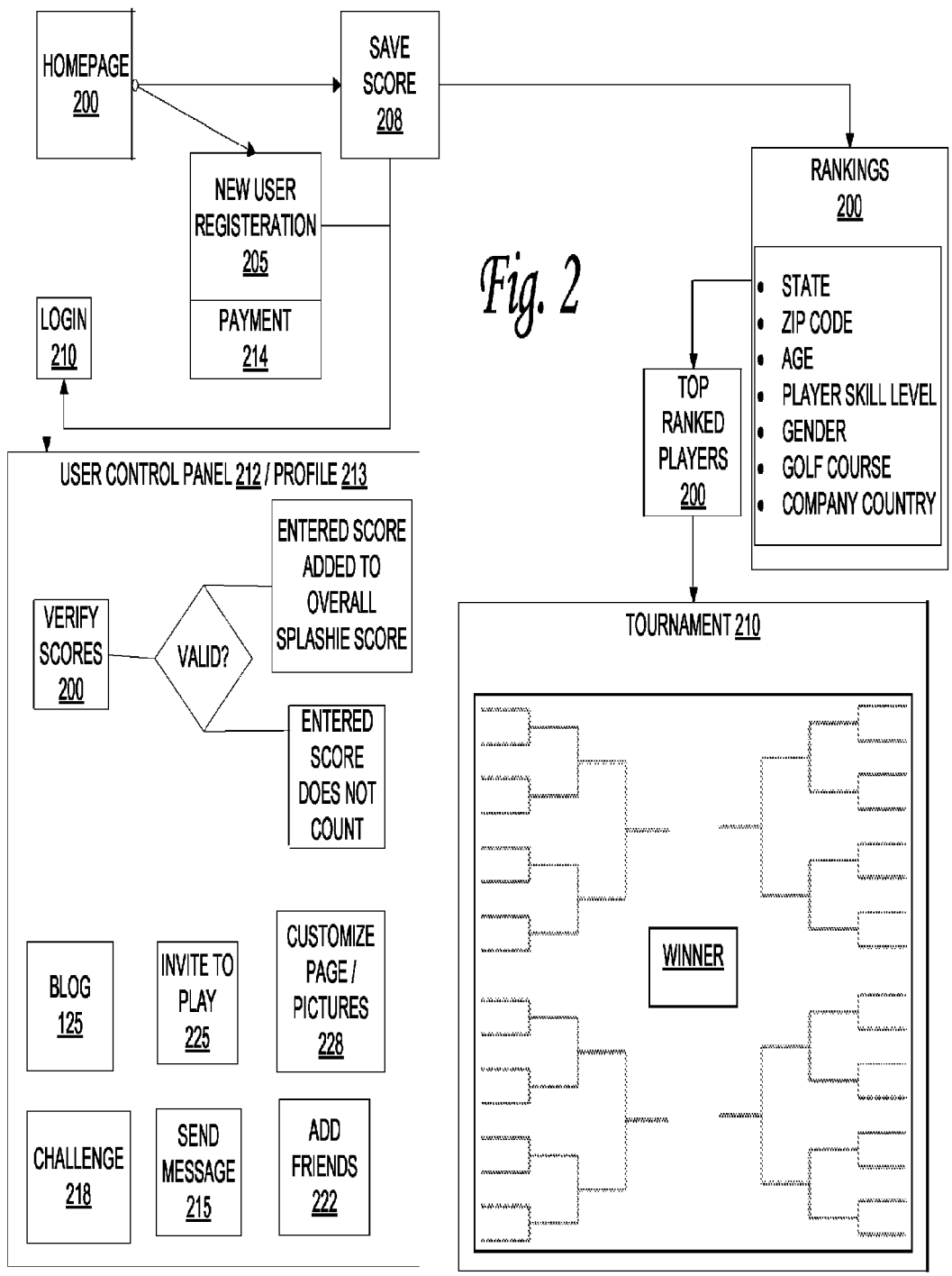
FIG. 2 is a block diagram of a system for measuring the performance of a player.

FIG. 2 depicts a more detailed block diagram of system 100 in accordance with the principles of the invention. In one embodiment, the system 100 includes a homepage 200 where a user may navigate to by using an Internet browser to register to become a member of the system 100. A user may click on a link to navigate to a registration page 205 where the user may be prompted to enter the user's personal information such as name, gender, email address, date of birth, residence address, golf course most often played, skill level, a photograph of the user and choose a system ID and system password. Skill levels may include junior, for child golfers; hacker, for low skill golfers; scratch for high skill golfers; pros for professional golfers; and senior, for old golfers.

Once the user has registered the system 100 starts tracking the user's performance and a user profile 213 is generated by the system 100 where the user's performance may be viewed by other users registered in the system 100. The user may also submit a payment to participate in one or more tournaments 210 where a prize is awarded to the winner based up the user with the highest Splashie score (as defined below). In some embodiments no payment is necessary for entry into the tournament 210 or other tournaments. For already registered users, the user may enter in his score 208 at the homepage 200 and then may be prompted to log into they system 210. For example, a registered user may enter in 1 eagle (2 strokes or less under par), 3 birdies (1 stroke under par), 5 pars, 4 bogies (1 stroke over par), 3 double bogies (2 strokes over par) and 2 triple bodies (3 strokes or more over par). Par ranges from 3 to 5 strokes for a hole and varies depending on the length of the hole. The par for individual holes may be determined by the golf course the user plays on.

Figure 3:
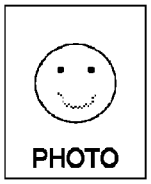
FIG. 3 is a block diagram of a control panel and/or profile page of a user of a system for measuring the performance of a player.

Referring to FIGS. 2 and 3, once the user has registered, he may navigate to a user control panel 212. The control panel 212 allows the user access various features of the system 100. For example, the control panel 212 may display the user's Splashie Score 300. The system 200 computes the user's Splashie Score based on an 18 hole round of golf played by the user. A user plays a round of golf and enters the number of eagles, birdies, pars, bogeys, double bogeys, triple bogeys they received as defined above into the system 100. In one preferred embodiment, the Splashie score may be defined as:

Splashie score=$aU+bV+cW+dX+eY+fZ$. Where U, V, W, X, Y, Z are the number of eagles, birdies, pars, bogeys, double bogeys, and triple bogeys respectively, and a, b, c, d, e, and f their corresponding weights, Where $U+V+W+X+Y+Z=18$, since a round of golf is 18 holes played.

Figure 4:
FIG. 4 is a flow chart of a method for determining who competes in and who is the winner of a golf tournament utilizing a system for measuring the performance of a player.

Referring to FIG. 4, the system may be configured to perform the following steps. In a step 400, the system receives a set of scores for 18 holes of golf played by a golfer. In a step 410, the system assigns weight factors for each type of score such that the weight factor for a score is always higher than the weight factor for a worse score. In a step 420, the system computes a Splashie score based on an assigned set of weight factors for each type of score received by the golfer on the holes played. In a step 430, the system enters top ranked golfers into a golf tournament. In a step 440, the winner of the tournament is determined based on the Splashie score received during the tournament 440.

In one alternative embodiment, the Splashie score weights (i.e. a, b, c, etc.) may also be chosen so that the Splashie score is greater for one player versus another, so that a weaker player may play against a professional golfer or a player of greater ability via the system 100 and pose a challenge to the stronger player. By varying the weights assigned to players of different levels, a Splashie score may be used to compare a standard weighted Splashie score to a nonstandard weighted Splashie score. In one preferred embodiment, the weights are chosen such that: the weight of an eagle is greater than a the weight of a birdie; the weight of a birdie is greater than the weight of a par; the weight of a par is greater than the weight of a bogie; the weight of a bogie is greater than the weight of a double bogie; and the weight of a double bogie is greater than the weight of a triple bogie. If the weights are chosen as mentioned immediately above then the golfer who played the least strokes will have the highest Splashie score. In one embodiment, the system treats an eagle score as any score that is two strokes or fewer for a hole and the system treats a triple bogie as three strokes or more received by a user for a hole played.

For the game of bowling, the system may be implemented so that instead of eagles, pars bogies etc. being reported for each frame, a strike, a spare, a nine, an eight and a seven is inputted into the system.

A system 100 that utilizes a Splashie score may be capable of enabling individuals in different geographic locations to create golf leagues on the system 100 and play and compete with each other year round. Since the Splashie score does not depend on parameters such as course rating and slope, the method and system 100 provide a simple way for golfers to keep track of their performance.

In one embodiment, the system 100 may display various computations of a user's Splashie scores in a Splashie score section 302 of the user's control panel 212 or profile page 213. For example, the Splashie score section 302 may contain an overall Splashie score for a user which is the arithmetic mean of every Splashie score entered by the user. The section 302 may include an overall verified Splashie score which is the arithmetic mean of all verified Splashie scores for the user. The section 302 may further include a numerical rank of the user based on his Splashie scores among all the users in the system 100. Other values may include the average Splashie score for a particular year, the user's average Splashie score over a recent time period, for example, the most recent five rounds of golf played. With reference to FIGS. 3 and 4, in one embodiment a user has the option to select which Splashie score information is computed and displayed by the system 100, and examples may include: lifetime Splashie score; annual Splashie score; monthly Splashie score; weekly Splashie score; and Splashie score ranking by postal zip code, age, level of play, gender, state, country, county, or golf course played.

In another embodiment, the user may configure his profile 213 via the control panel 212 to include a blog 125, a bio 305, and a friends list 308 which may include a graphical display of a list of other users mutually selected by the user and the other users on the list. The user may also configure his display handle, and upload pictures 228 displayed by a link 312. The profile 212, 213 may display data regarding the user's gender, age, skill level, location and date of last login. In some embodiments, the data regarding the user may be configurable by the user.

With further reference to FIGS. 2 and 3, the profile page 213 may include a function section 315 that can provide functions available to other users viewing a user's profile page 213. For example, the function section 315 may have links that another user may click: to send a message 215 to the user; to challenge 218 the user; to verify a score 220 of the user; to request that viewing user be added to user's friends list 222; to add the user to a league; to chat with the user via an instant messenger; and to invite the user to play a round of golf in real time 225.

In one embodiment, users may establish leagues on the system 100 where a separate ranking is computed by the system within the group of players in the league. Leagues may be based on any number of criteria. For example, a league may be composed of users who are all employed at a particular company. In another example, a league may be based on users who play at a particular golf course. In one example implementation, members of different leagues may compete against one another. Two leagues comprised of members from two individual companies may compete with each other for the top Splashie score after a predetermined number of rounds of golf. In some embodiments, the rounds do not have to be played at the same locations as some users may be separated by large geographical distances.

Figure 5:
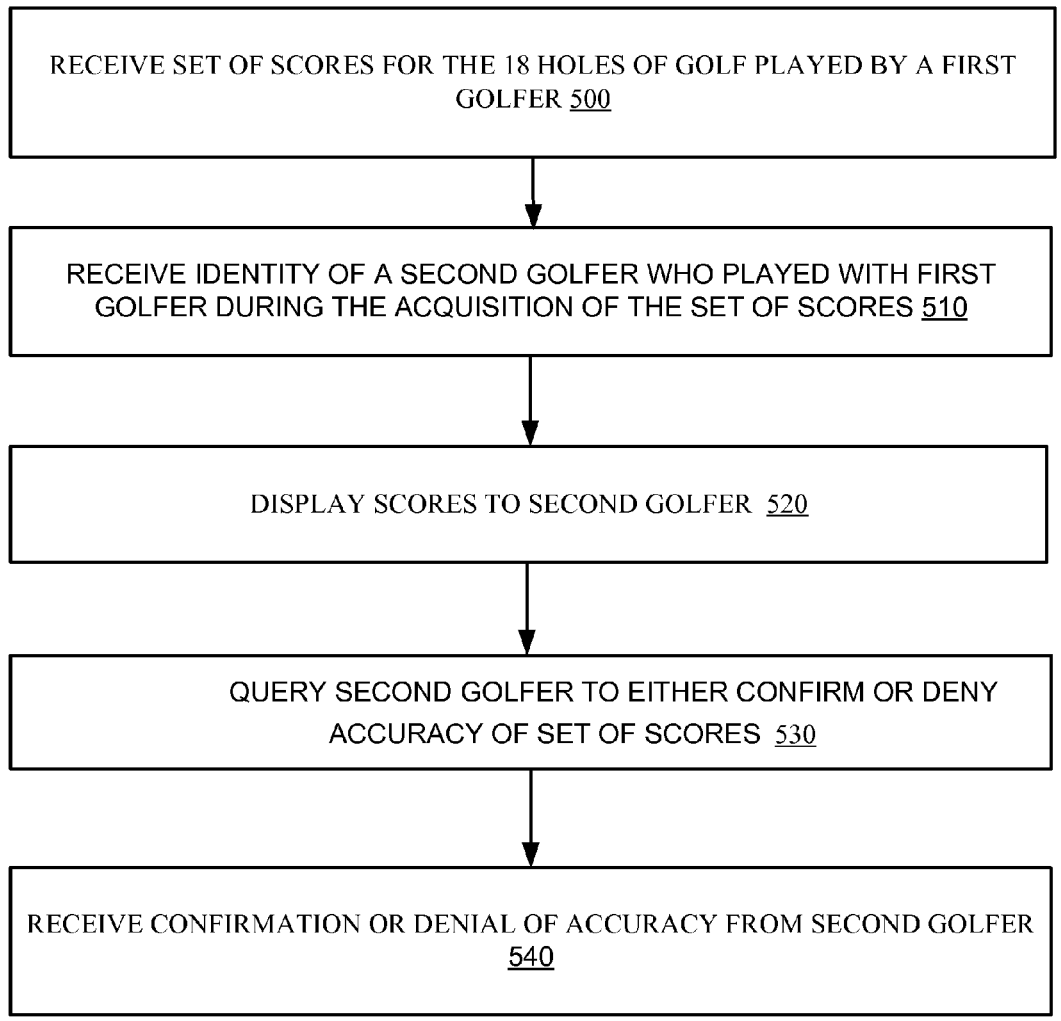
FIG. 5 is a flow chart of a method for verifying scores on a system for measuring the performance of a player.

In a further embodiment, the system may be configured to verify a first golfer's score. Referring to FIG. 5, in a step 500, the system is configured to receive a set of scores for the 18 holes of golf played by the first golfer. In a step 510, the system is configured to receive from the first golfer the identity of a second golfer who played with first golfer during the acquisition of the set of scores 510. In a step 520, the system is configured to display the received scores from the first golfer to the second golfer. In a step 530, the system is configured to query the second golfer to either confirm or deny accuracy of the set of scores. In a step 540, the system is configured to receive either a confirmation or denial of the accuracy of the scores. If a confirmation is received, then the system assigns a status of verified to the score.

If the leagues contain unequal numbers of members competing in a league tournament, in one embodiment, the system 100 may take the mean of the top Splashie scores of both teams. The number of top Splashie scores is determined by choosing a number less than or equal to the number of users in the smaller league. For example, if one league has 5 users and another 10 users, the system 100 may use the mean of the top 5 Splashie scores of each league to determine the winner based on the highest mean Splashie score.

In another embodiment, the system for measuring the performance of a participant may be implemented on a computer readable medium in communicative contact with a network and having a database. The system is configured to compute a Splashie score (as defined above) for each user. The system may store the computed Splashie scores associated with each user in a ranking database. The system may rank a plurality of users based on their Splashie scores associated with each of them. The system may be configured to select a set of users from the ranking database and store data representing the users in a tournament qualifier database, wherein the participants in the tournament qualifier database are selected to compete in a game tournament for a prize. The winner of the tournament may be determined by the player having the highest Splashie score for the tournament after all rounds of golf played during the tournament.

In another embodiment, the system is configured to request a verification of a score entered by a user. The system may communicate the entered score to a second user and query the second user to either confirm the accuracy of the entered score or deny the accuracy of the entered score. An entered set that has been confirmed by a second user a verified score. The system will only stores data in the tournament qualifier database if it is based on verified scores. Thus, the selection of which user is entered into the tournament is based only on verified scores. In a preferred embodiment, the second user is a golfer played all 18 holes with the first user in the same group, for example, the same foursome. It is typical for golf courses to group golfers into fours to play the course together.

Figure 6:
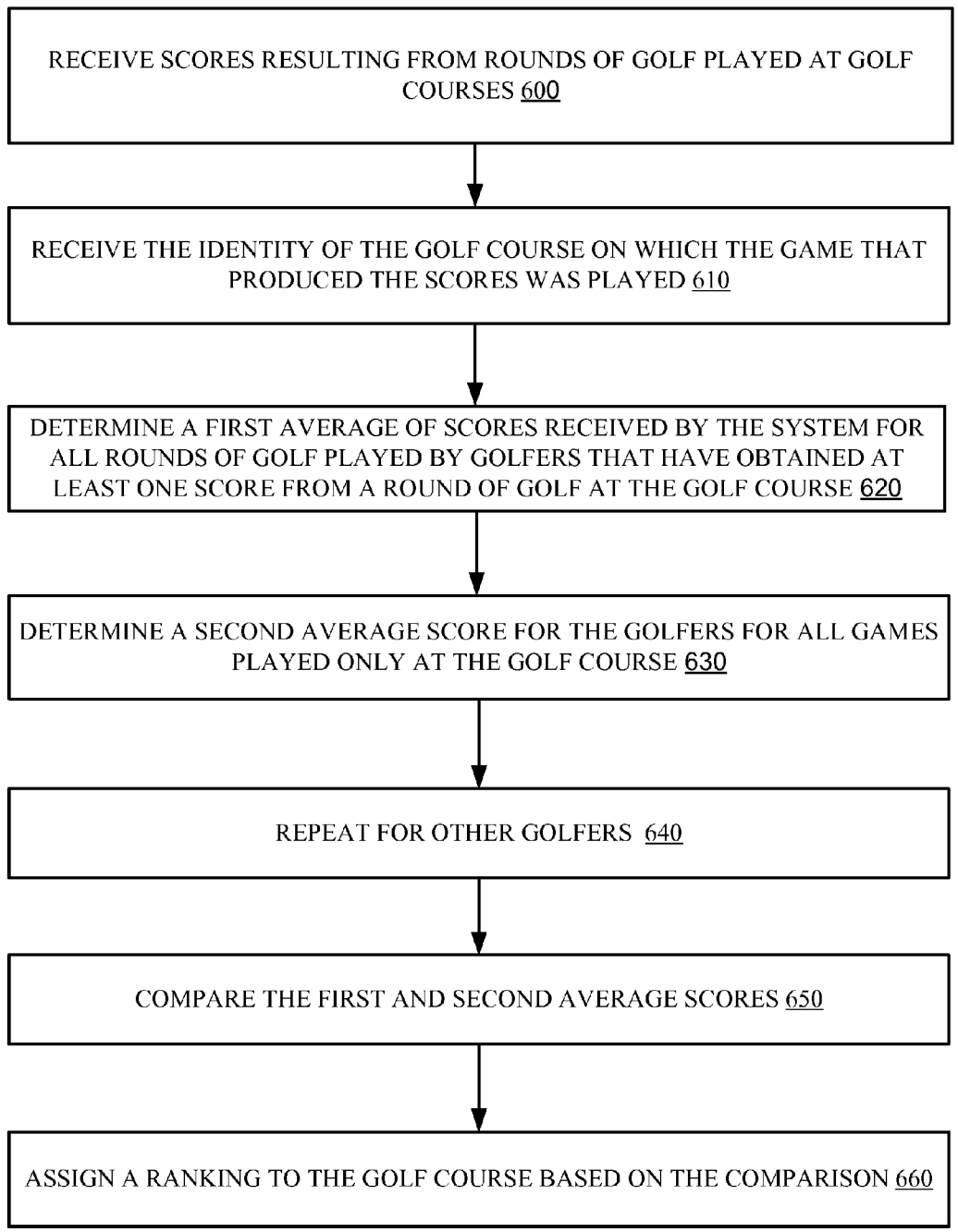
FIG. 6 is a flow chart of a method for ranking the difficulty of a golf.

In another embodiment, the system is also configured to rank the degree of difficulty of a golf course. The system may be implemented on a computer readable medium in communicative contact with a network and have a database to store data regarding users who input their scores obtained on the golf course. The system may be configured to receive scores resulting from rounds of golf played at golf courses. A user plays a round of golf at a particular golf course. Referring to FIG. 6, in steps 600 and 610 respectively, the system receives the identity of the golf course, and the score from the user.

In a preferred embodiment, the user inputs the individual respective numbers of eagles, birdies, pars, bogies, double bogies, and triple bogies, into the system. Therefore, the system does not need to know the par for the course. In a preferred embodiment, the system if configured to perform the following steps. In a step 620, the system may determine an overall average of Splashie scores received by the system for all rounds of golf played by the user. In a step 630, the system also determines the average Splashie score of the user for all rounds of golf played only at the golf course. In a step 650, the system compares the user's overall average and the user's average Splashie score for only rounds played by the user at the golf course scores. In a step 640, the system may repeat this for many other golfers who played on the golf course and determine an average difference from users' overall average and average for the golf course only. In a step 660, the system may be configured to assign a ranking to the golf course based on the comparison. In one method of ranking, if there are 1000 golf courses compared by the system, the most difficult course is assigned a ranking of 1000 and the easiest is assigned 1. Step 650 may be performed by utilizing the information obtained from step 640. For example, a golf course that is more difficult compared to other courses will have a higher percentage of users with average Splashie scores for the course that are lower than the users' overall average Splashie score for all courses. A golf course that is less difficult compared to other courses will have a lower percentage of users with average Splashie scores for the course that are higher than the users' overall average Splashie score for all courses.

In a further embodiment, when two or more users have the same Splashie score the system may assign different rankings to the users based on one or more methods. In one embodiment, the user having played more than 5 rounds is assigned a rank higher than a person having played less than 5 rounds. If there is a tie between users that have played more than 5 rounds then this rule cannot break the tie and another method is utilized (even if a user may have played 110 rounds and the other only 6 rounds).

In another embodiment, when two or more users have the same Splashie score, the user with the highest average Splashie score for the immediate previous four rounds of golf played determines the higher ranked user.

In another alternative embodiment, when two or more users have the same Splashie score, the system considers the trend over the immediately previous four rounds of golf played. The user that has been continually improving their score over the previous four rounds is assigned a higher rank. This method operates as follows: If the scores for the previous four rounds are a, b, c, d with d being the most recent round, the following number is computed: $(a-b)+(b-c)+(c-d)$. The user with the highest number is assigned a higher rank.

In still another embodiment, the system may be configured to receive the scores for each hole played during each round of golf entered into the system by a user. For example, the system may be configured so that the user may specify either he obtained an eagle, birdie, par, bogie, double bogie or triple bogie for each of the 18 holes and specify which hole each score was earn on. When two or more users have the same Splashie score, the system may determine the user with the most bogeys immediately followed by a birdie over the immediately previous three rounds and assigns this user the higher rank. This method indicates a user who may be mentally strong while played under pressure. In another example, any bogie whether double triple etc. followed by a birdie counts in the determination of breaking the tie as specified above.

In a further embodiment, when two or more users have the same Splashie score, the system may determine the person having the longest uninterrupted streak of pars, birdies, and/or eagles without having any type of bogey, over the immediately previous four rounds. This method rewards consistent good play.

In yet another embodiment, when two or more users have the same Splashie score, the system may subtract points from the Splashie score for triple bogeys, double bogeys and bogeys.

In still another embodiment, when two or more users have the same Splashie score, the system may be configured to assign a higher rank to the user whose scores were verified by other users who on average have a higher Splashie score than the other user with the same Splashie score. Having users with higher average Splashie scores verify a first user's score would indicate that the first user plays with other users with high proficiency in golf.

In another embodiment, the Splashie score obtained for a particular round of golf played on a golf course is adjusted for the ranking of the golf course based on it difficulty. For example, assuming there are 1001 golf courses in the system that ranked by difficulty with the most difficult assigned a rank of 1001. The 501st golf course is the median and is assigned a weight factor of 1.0. In one example, weight factors are defined from 0.5 to 1.5, however any desired range can be used depending on how one wants to scale the adjusted Splashie score. 0.5 divided by 500 equals 0.001. The assignment of weight factors for each course is as follows. The 502nd ranked course is assigned $1.0+0.001=1.001$. The 503rd is assigned $1.0+2\times(0.001)=1.002$. The 504th is assigned $1.0+3\times(0.001)=1.003$. Thus the 1001st ranked course will be assigned $1.0+500\times(0.001)=1.5$ and the 1st ranked course is assigned $1.0-500\times(0.001)=0.5$. Similarly, the 500th and 499th are assigned $1.0-1\times(0.001)=0.999$ and $1.0-2\times(0.001)=0.998$ respectively. In this example, a Splashie score adjusted for having obtained the score on the 750th ranked difficult golf course may be determine by (Splashie score)×$[1.0+249\times(0.001)]=1.249$(Splashie Score).

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for measuring the performance of a participant in a game, wherein the game is comprised of a series of discrete trials wherein for each trial the participant receives a score selected from one of a finite set of discrete scores based on the participant's performance for each trial, the system comprising a processor and a non-transitory computer readable medium in communicative contact with a network and having a database, the system configured to:
   receive over the network a set of counts corresponding to the numbers of each score from the discrete set received by the participant for each trial during the game;
   compute a weighted score based on an assigned set of weight factors for each type of score in the discrete set and an entered set of counts of each score from the discrete set;
   wherein the computed weighted score corresponds to the performance of the participant in the game;
   wherein the system is configured to measure the performance of a plurality of participants by:
   computing weighted scores for each participant;
   storing the computed weighted scores associated with each participant in a ranking database; and
   ranking the plurality of participants based on the computed weighted score associated with each participant
   wherein the system is configured to:
   determine a first average computed weighted score for each participant for all games played by participants who have obtained at least one computed weighted score from playing the game at a first location where the game is played;
   determine a second average computed weighted score for each participant for all games played only at the first location by the participant; and
   compare the first and second average computed weighted scores.

2. The system for measuring the performance of a participant in a game of claim 1, wherein the game is golf and the trials comprise each hole played by the participant.

3. The system for measuring the performance of a participant in a game of claim 1, wherein the game is golf and wherein the discrete set contains scores comprising an eagle, a birdie, a par, a bogie, a double bogie and a triple bogie.

4. The system for measuring the performance of a participant in a game of claim 3 wherein the weight factors are selected so that the weight factor assigned to an eagle is greater than the weight factor assigned to a birdie and the weight factor assigned to a birdie is greater than the weight factor assigned to a par and the weight factor assigned to a par is greater than the weight factor assigned to a bogie and the weight factor assigned to a bogie is greater than the weight factor assigned to a double bogie and the weight factor assigned to a double bogie is greater than the weight factor assigned to a triple bogie.

5. The system for measuring the performance of a participant in a game of claim 4 wherein an eagle score corresponds to under par two strokes or fewer for a hole and a triple bogie corresponds to three strokes over par or more received by the participant for a hole played.

6. The system for measuring the performance of a participant in a game of claim 1, wherein the system is configured to select a set of participants from the ranking database and store data representing the participants in a tournament qualifier database, wherein the participants in the tournament qualifier database are selected to compete in a game tournament for a prize.

7. The system for measuring the performance of a participant in a game of claim 6, wherein the system is configured to request a verification of the entered set of counts of each score from the discrete set from a second participant, wherein the system communicates the entered set to the second participant and the system is configured to query the second participant to either confirm the accuracy of the entered set or deny the accuracy of the entered set, wherein an entered set that has been confirmed by a second participant is a verified set, and wherein the system only stores data in the tournament qualifier database if it is based on verified sets.

8. The system for measuring the performance of a participant in a game of claim 1, wherein the system is configured to output the computed weighted score to a user on the network.

9. The system for measuring the performance of a participant in a game of claim 1, wherein the system is configured to request a verification of the entered set of counts of each score from the discrete set from a second participant, wherein the system communicates the entered set to the second participant and queries the second participant to either confirm the accuracy of the entered set or deny the accuracy of the entered set.

10. A method for measuring the performance of a plurality of golfers in a game of golf, wherein the game is comprised of 18 holes and for each hole a golfer receives a score based on the number of strokes executed to complete the hole, the method comprising:
receiving over a network a set of counts corresponding to the numbers of each type of score from a set received by the golfer for each hole during the game, wherein the network is in communicative contact with a processor and a non-transitory computer readable medium;
computing a weighted score based on an assigned set of weight factors for each type of score in the received set and an entered set of counts of each score from the received set, wherein the computed weighted score corresponds to the performance of the golfer in the game;
measuring the performance of the plurality of golfers by:
computing weighted scores for each golfer;
storing the computed weighted scores associated with each golfer in a ranking database; and
ranking the plurality of golfers based on the computed weighted score associated with each golfer
wherein the computed weighted score is determined by the equation score=$aU+bV+cW+dX+eY+fZ$, wherein U, V, W, X, Y, Z are the number of eagles, birdies, pars, bogeys, double bogeys, and triple bogeys respectively, and a, b, c, d, e, and f are their corresponding weight factors, where $U+V+W+X+Y+Z=18$, for a round of golf.

11. The method for measuring the performance of a plurality of golfers in a game of golf of claim 10, wherein all scores that correspond to completing a hole in two strokes below par are treated identical to one another for computing the weighted score and all scores that correspond to completing a hole in three strokes above par or more are treated identically for computing the weighted score.

12. The method for measuring the performance of a plurality of golfers in a game of golf of claim 10, wherein an eagle score corresponds to completing a hole with two strokes or fewer under par for a hole and a triple bogey corresponds to completing a hole with three strokes or more over par by the participant for a hole played.

13. The method for measuring the performance of a plurality of golfers in a game of golf of claim 10, wherein the weight factors are selected so that the weight factor assigned to an eagle is greater than the weight factor assigned to a birdie and the weight factor assigned to a birdie is greater than the weight factor assigned to a par and the weight factor assigned to a par is greater than the weight factor assigned to a bogie and the weight factor assigned to a bogie is greater than the weight factor assigned to a double bogie and the weight factor assigned to a double bogie is greater than the weight factor assigned to a triple bogie.

14. The method for measuring the performance of a plurality of golfers in a game of golf of claim 10, further comprising, selecting a set of golfers having the highest rankings based on the computed weighted scores and entering the selected golfers into a golf tournament, wherein the golfers in the tournament compete in a golf tournament for a prize, the winner of the tournament being determined by the golfer with the highest computed weighted score for the tournament.

15. The method for measuring the performance of a plurality of golfers in a game of golf of claim 14, further comprising:
verifying the received set of scores for the 18 holes of golf played by the golfer, the verification comprising receiving a confirmation or a denial of the scores from a second golfer that played with the golfer on all 18 holes corresponding to the received scores; and
selecting only golfers having a received set of scores that have been verified to compete in the golf tournament.

16. The method for measuring the performance of a plurality of golfers in a game of golf of claim 10, wherein ranking the plurality of golfers based on the computed weighted score of each golfer comprises ranking only members of a particular group, the particular group is ranked based on any one of the following:
all golfers of the same age in years;
all golfers of the same skill level;
all golfers of the same gender;
all golfers who played on the same golf courses;
all golfers of the same postal zip code of residence;
all golfers who share the same employer;
all golfers of the same state of residence; or
all golfers of the same country of residences.

17. The method for measuring the performance of a plurality golfers in a game of golf of claim 10, further comprising:
verifying the received set of scores for the 18 holes of golf played by the golfer, the verification comprising receiving a confirmation or a denial of the scores from a second golfer that played with the golfer on all 18 holes corresponding to the received scores.

18. A system for measuring the performance of participant in a game, wherein the game is comprised of a series of discrete trials wherein for each trial the participant receives a score selected from one of a finite set of discrete scores based on the participant's performance for each trial, the system comprising a processor and a non-transitory computer readable medium in communicative contact with a network and having a database, the system configured to:
receive over the network a set of counts corresponding to the numbers of each score from the discrete set received by the participant for each trial during the game;
compute a weighted score based on an assigned set of weight factors for each type of score in the discrete set and an entered set of counts of each score from the discrete set;
wherein the computed weighted score corresponds to the performance of a participant in a game;
wherein the system is configured to measure the performance of a plurality of participants by:
computing weighted scores for each participant;
storing the computed weighted scores associated with each participant in a ranking database; and
ranking the plurality of participants based on the computed weighted score associated with each participant
wherein the system is configured to:

determine a first average computed weighted score for each participant for all games played by participants who have obtained at least one computed weighted score from playing the game at a first location where the game is played;

determine a second average computed weighted score for each participant for all games played only at the first location by the participant; and compare the first and second average computed weighted scores;

wherein if two or more participants have the same average computed weighted scores, the system is configured to assign different rankings to each of the two or more participants based on the composition of the first and second average computed weighted scores.

19. A system for measuring the performance of a participant in a game of golf, wherein the game is comprised of a series of 18 holes played wherein for each hole the participant receives a score selected from one of a set of containing, eagle, birdie, par, bogey, double bogey, triple bogie, based on the number of strokes it required for the participant to put a ball in the hole, the system comprising a processor and a non-transitory computer readable medium in communicative contact with a network and having a database, the system configured to:

receive over the network a set of counts corresponding to the numbers of each type of score from the set received by the participant for each hole during the game;

compute a weighted score based on an assigned set of weight factors for each type of score in the discrete set and an entered set of counts of each score from the set;

wherein the computed weighted score corresponds to the performance of a participant in a game;

wherein the system is configured to measure the performance of a plurality of participants by:

computing weighted scores for each participant;

storing the computed weighted scores associated with each participant in a ranking database; and ranking the plurality of participants based on the computed weighted score associated with each participant wherein the computed weighted score is determined by the equation score=$aU+bV+cW+dX+eY+fZ$, wherein $U, V, W, X, Y, Z$ are the number of eagles, birdies, pars, bogeys, double bogeys, and triple bogeys respectively, and $a, b, c, d, e,$ and $f$ are their corresponding weight factors, where $U+V+W+X+Y+Z=18$, for a round of golf.

\* \* \* \* \*